(No Model.) 2 Sheets—Sheet 2.
C. W. SIEMENS.
Electric Lamp.
No. 233,289. Patented Oct. 12, 1880.
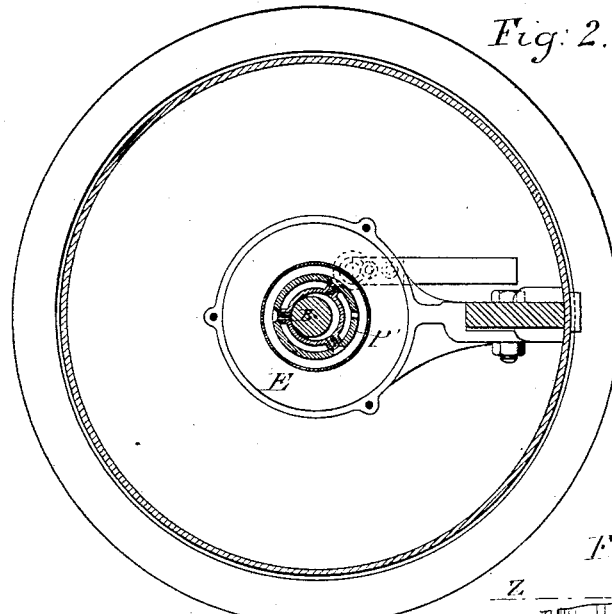
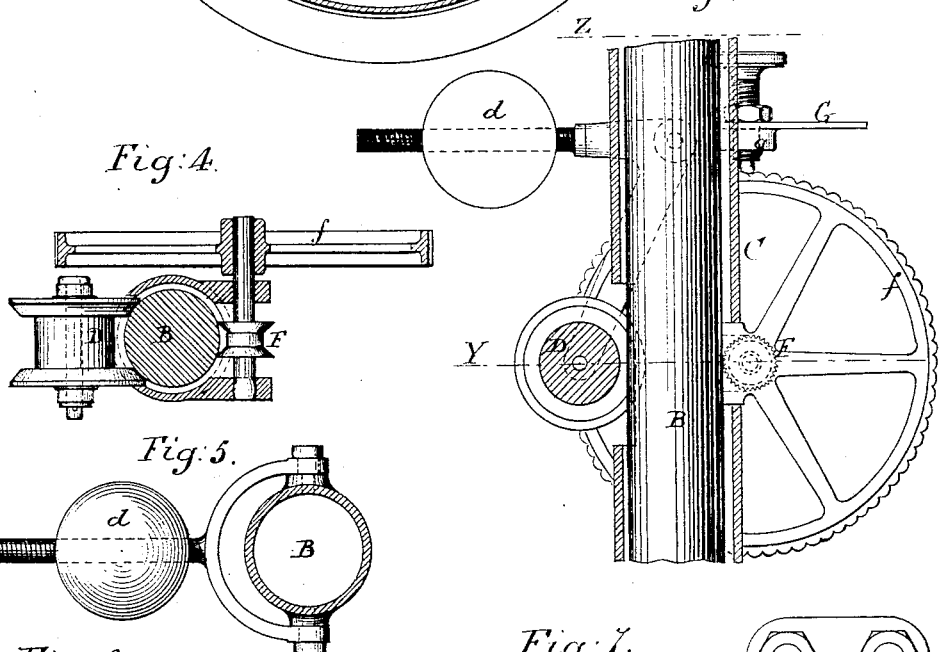
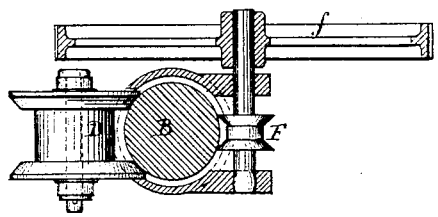
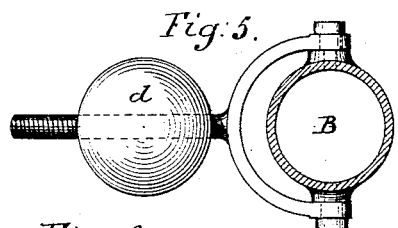
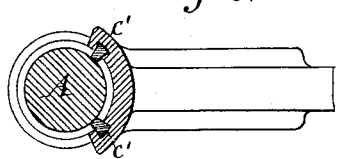
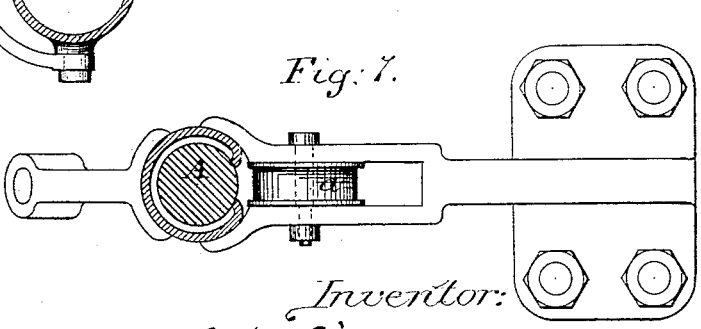
Witnesses:
W. B. Whitman
Frank Martin
Inventor:
C. W. Siemens
by Charles S. Whitman, atty

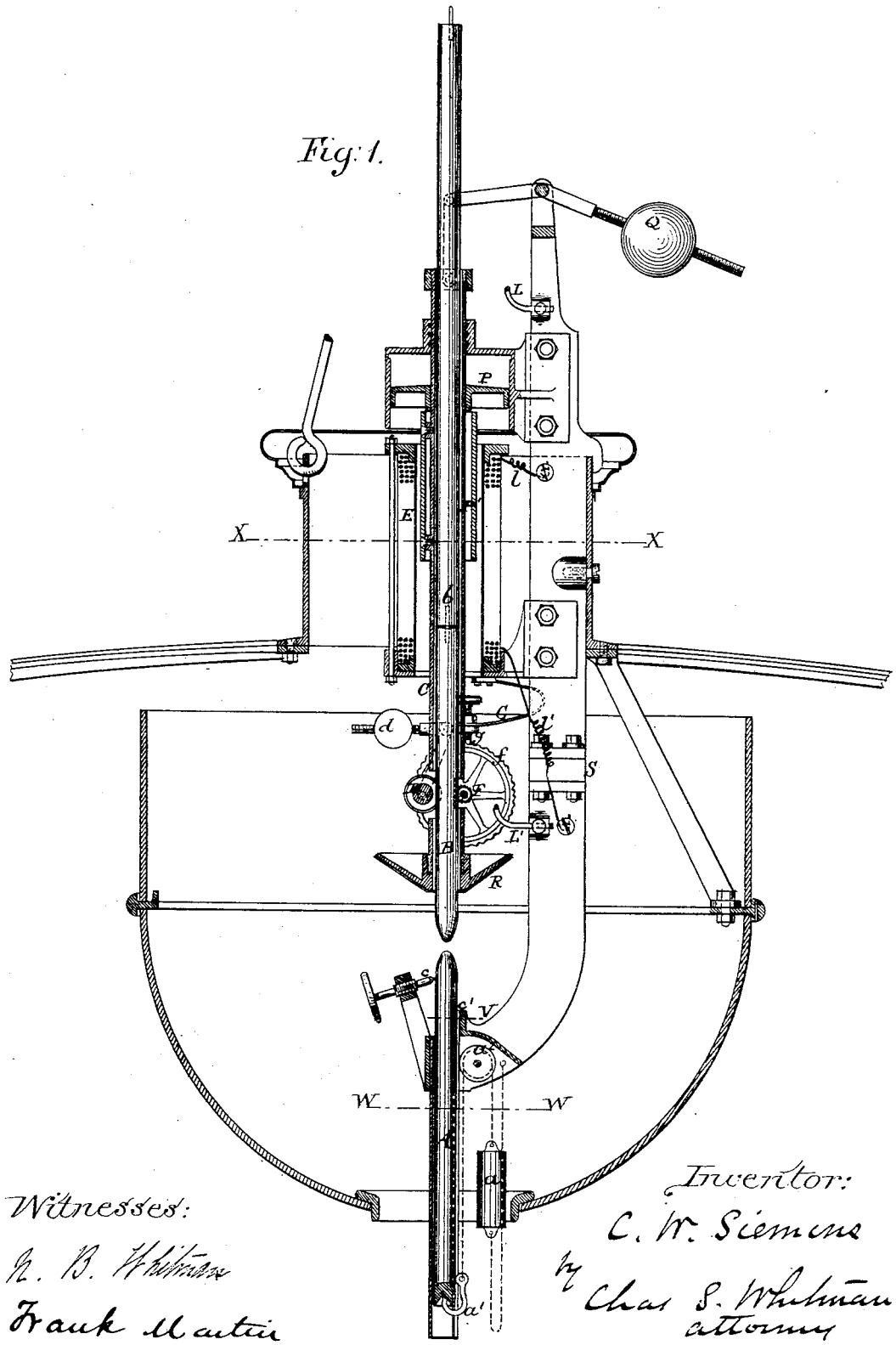

UNITED STATES PATENT OFFICE.

CHARLES W. SIEMENS, OF WESTMINSTER, ENGLAND.

ELECTRIC LAMP.

SPECIFICATION forming part of Letters Patent No. 233,289, dated October 12, 1880.

Application filed May 12, 1880. (No model.)

*To all whom it may concern:*

Be it known that I, CHARLES WILLIAM SIEMENS, of Westminster, in the county of Middlesex, England, have invented a new and useful Improvement in Electric Lamps, of which the following is a specification.

My invention relates to a construction of electric lamp having vertical carbons, with means of advancing them as they are consumed, and regulating their distance automatically, as I will describe, referring to the accompanying drawings.

Figure 1 is a vertical section of the lamp. Fig. 2 is an enlarged sectional plan on the line X X of Fig. 1. The other figures show, to an enlarged scale, constructive details of parts of the lamp—that is to say, Fig. 3 is a part vertical section of the upper carbon and its feeding mechanism. Figs. 4 and 5 are sectional plans on the lines Y and Z of Fig. 3, respectively. Fig. 6 is a plan at V of Fig. 1, looking downward; and Fig. 7 is a sectional plan on W W of Fig. 1, looking upward.

A is the lower carbon, which is pressed upward by a hook, $a'$, inserted in a countersunk hollow at its end, this hook being drawn by a weight, $a$, attached to it by a cord or tape or flexible metal strip passing over a pulley, $a^2$. The upper end of the carbon A is lightly clamped between two edges, $c'$ $c'$, and the point of a screw, $c$, above them, the clamping pressure being adjusted by the screw $c$, so as just to retain the carbon in opposition to the weight $a$ until, by the washing of the upper end of the carbon, the pressure of the point $c$ on it is sufficiently reduced to permit it to move upward. This mode of feeding a carbon, being described in the specification accompanying an application for Letters Patent of the same date herewith, is not intended to be claimed herein, though it is now described for the sake of clearness.

B is the upper carbon, held in its guide-tube C between a grooved roller, D, which is pressed against the carbon by a weight, $d$, and a serrated roller, F, on the axis of a wheel, $f$, having shallow teeth or serrations round its periphery, in which engages the point of an adjusting-screw, $g$, pressed down by a spring, G.

On the guide-tube C is fixed an iron tube, P′, which is free to move up and down within a solenoid coil, E, consisting of a large number of convolutions of fine wire, presenting high electrical resistance. The guide-tube C has also on it a piston, P, working in a cylinder having one or more small air-holes through its cover.

Q is a counter-weight, adjustable on a lever which is linked to the guide-tube C.

R is a reflector, which protects the mechanism above from the heat of the voltaic arc.

The lower part of the framing of the lamp which carries the lower carbon is insulated from the upper part by a non-conducting junction at S.

The line-wires L and L′ are connected, respectively, to the upper and lower parts of the framing, and through these to the two carbons. There is, besides, an electrical connection of these two parts through the coil E by the wires $l$ $l'$. The weight Q being so adjusted as to slightly overbalance the tube C and parts attached to it, the carbons are kept apart.

When the lamp is put in circuit the electricity, having to pass through the coil E, excites it so that it attracts the core P′ downward, causing the upper carbon to approach the lower one till the electricity can pass from the one to the other, kindling the lamp. Thereafter, if the carbons are too near each other, so that most of the electricity passes through them, and little passes through the coil E, the attraction on P′ being reduced, the carbons become separated. If they are too far apart, so that little of the electricity passes through them and most of it passes through the coil E, then the core P′, being attracted downward, causes the carbons to approach each other. The resistance of the air to the piston P damps the vertical oscillations of the tube and carbon. When, owing to the wasting of the carbon, the tube C, along with the wheel $f$, has descended so low that the pin $g$ bears very slightly on the teeth of $f$, then $f$ being free to revolve along with the serrated roller F, the carbon itself descends in the tube. Thus, while the lower carbon, A, is continually pressed upward as it wastes by the action of the weight $a$, and while the upper carbon, B, is by the release of the wheel $f$ allowed to descend as it wastes, and while the tube C, carrying the upper carbon, is kept floating, as it were, in balance by the action of the solenoid E on its core P', the distance of the carbon points remains automatically adjusted to suit the voltaic arc, the distance becoming increased when the electricity passes too freely from the one carbon to the other, and the distance becoming diminished when there is not sufficient passage of electricity from the one to the other. As the carbons waste fresh carbons having ends coned to fit the countersunk hollows at the ends of the old carbons can be added to them, the coned end of the carbon being dipped in sirup or caoutchouc solution, which, as the junction of the carbons becomes heated, cements them together. Or the carbons may be doweled together by a metal pin, as shown at $b$ in Fig. 1.

Having thus described the nature of my invention, and the best means I know of putting it in practice, I claim—

1. An electric lamp having vertical carbons, the lower carbon pressed upward by a weight against a clamping-pressure near its point which yields as the carbon wastes, and the upper carbon being held in a tube between rollers, which, when owing to waste of the carbon the tube descends in obedience to automatic regulating apparatus, release the carbon and allow it to descend in the tube, substantially as herein described.

2. The method of effecting the automatic regulation of the distance of carbons in an electric lamp by electrically connecting the carbons through a solenoid coil of high resistance having a core which, according as it is more or less attracted by the solenoid, bears with more or less force on the holder of the upper carbon, causing it to approach toward or permitting it to recede from the lower carbon, substantially as herein described.

3. The combination of the high-resistance coil E, through which the carbons are electrically connected, with its core P', the tube C, the rollers D and F, the serrated wheel $f$, spring G, and its adjustable screw $g$, for the purpose of automatically feeding the upper carbon and regulating its distance from the lower carbon, substantially as herein described.

4. In an electric lamp, the combination of a lower carbon fed upward by a weight acting against a clamp near its point, which yields as the carbon wastes, with an upper carbon fed downward and regulated as to distance from the lower carbon by means of a solenoid coil of high resistance, through which the carbons are electrically connected, and its core acting in combination with a serrated wheel and roller, substantially as herein described.

In testimony whereof I have signed my name to this specification, in the presence of two subscribing witnesses, this 22d day of April, 1880.

C. WILLIAM SIEMENS.

Witnesses:
 CHAS. ROCHE,
 GEO. WOOLLETT,
*Clerks to Messrs. Ridgway Brothers, 2 Waterloo Place, Pall Mall, London, Notaries.*